R. A. CARTER.
MACHINE FOR SCARFING BARS OR RODS.
APPLICATION FILED AUG. 12, 1914.

1,146,611.

Patented July 13, 1915.
2 SHEETS—SHEET 1.

WITNESSES

INVENTOR

R. A. CARTER.
MACHINE FOR SCARFING BARS OR RODS.
APPLICATION FILED AUG. 12, 1914.
1,146,611.
Patented July 13, 1915.
2 SHEETS—SHEET 2.
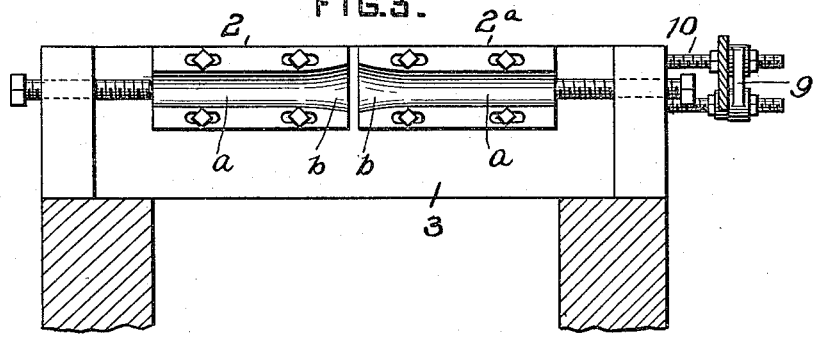
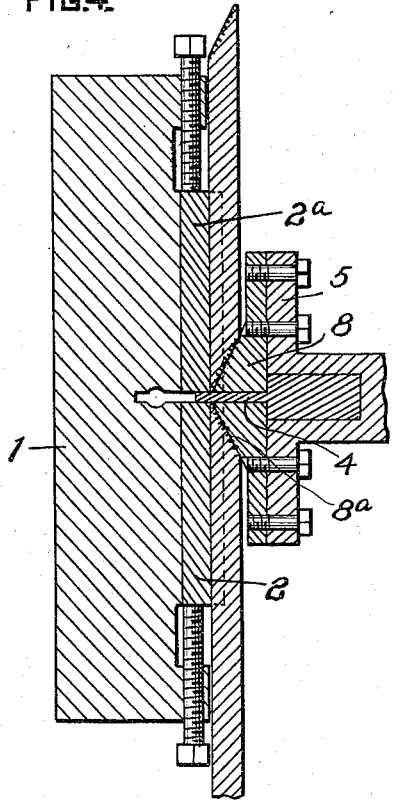
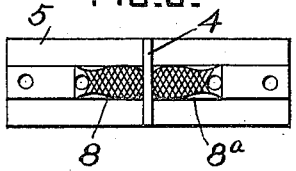
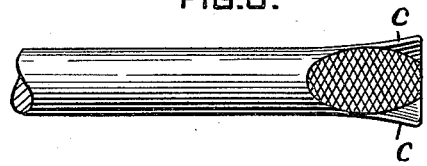
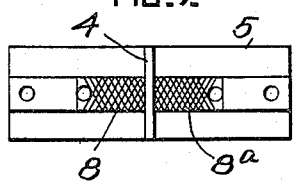
WITNESSES
INVENTOR

UNITED STATES PATENT OFFICE.

ROBERT A. CARTER, OF PITTSBURGH, PENNSYLVANIA.

MACHINE FOR SCARFING BARS OR RODS.

1,146,611. Specification of Letters Patent. Patented July 13, 1915.

Application filed August 12, 1914. Serial No. 856,381.

*To all whom it may concern:*

Be it known that I, ROBERT A. CARTER, residing at Pittsburgh, in the county of Allegheny and State of Pennsylvania, a citizen of the United States, have invented or discovered certain new and useful Improvements in Machines for Scarfing Bars or Rods, of which improvements the following is a specification.

The invention described herein relates to certain improvements in machines for shaping the ends of bars or rods, which are to be united by welding. It has heretofore been the practice especially in the manufacture of links to impart the desired bevel to the ends to be welded by a shearing operation, or to hammer out the ends one at a time to the desired bevel. In the shearing operation, the pressure of the shear blade generally distorts the ends so that they must be brought back to shape by hammering or other suitable means.

The invention described herein has for its object the provision of means whereby a simultaneous shaping of two surfaces preparatory to welding can be effected, and it is a further object of the invention to provide for the cutting of a bar or rod into sections of the desired length, and at the same operation to bevel and otherwise shape the portions of the metal on both sides of the cut.

The invention is hereinafter more fully described and claimed.

Figure 1:
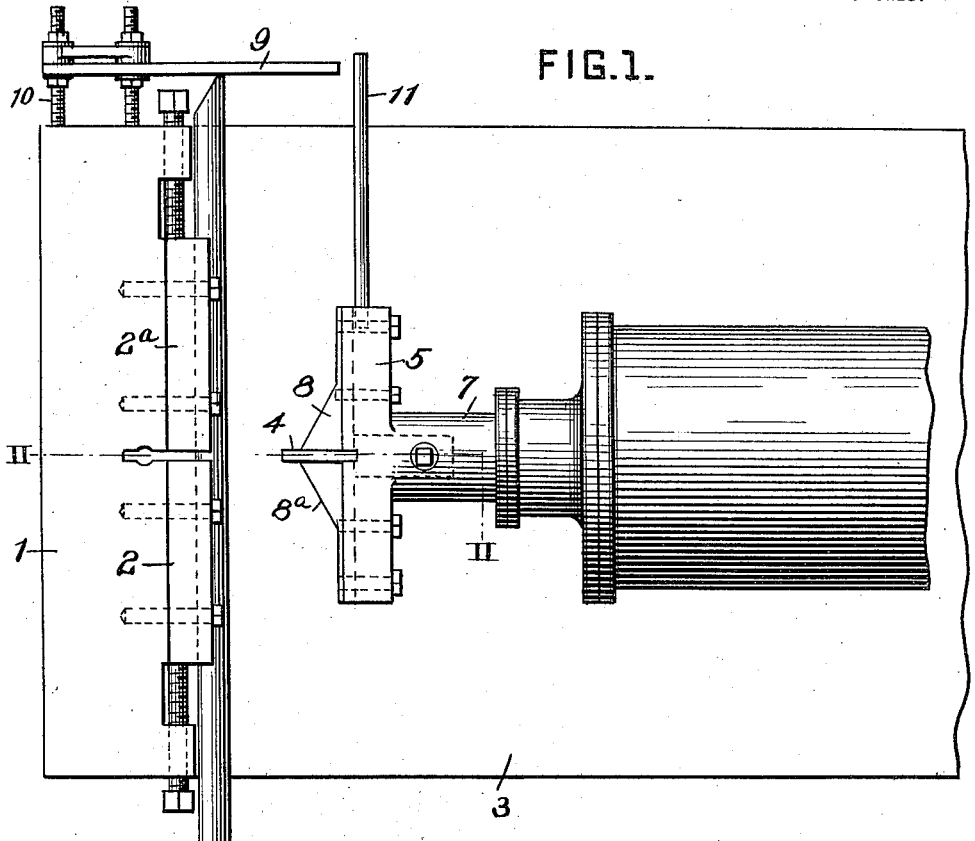
Figure 2:
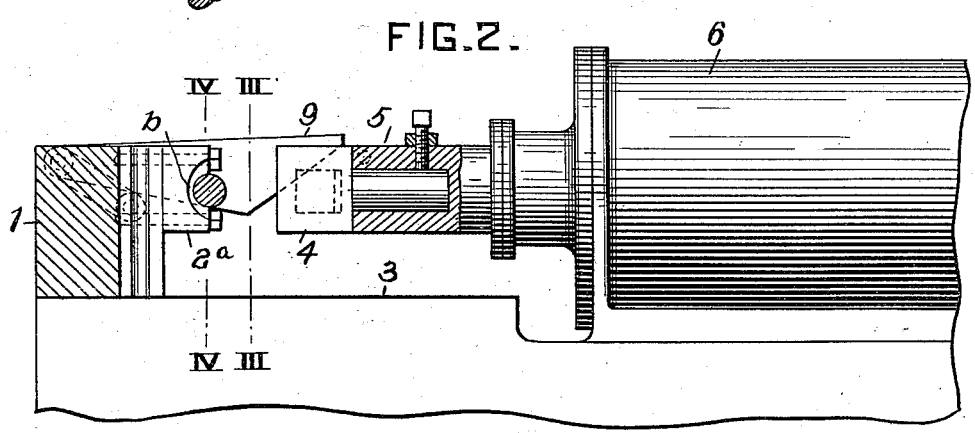

In the accompanying drawings forming a part of this specification, Figure 1 is a top plan view of my improved machine; Fig. 2 is a vertical section on a plane indicated by the line II—II Fig. 1; Figs. 3 and 4 are vertical sections indicated respectively by the lines III—III and IV—IV Fig. 2; Fig. 5 is an elevation of the shear blade and the adjacent male dies; Fig. 6 shows the shape imparted to the end of a bar or rod; Fig. 7 is a view similar to Fig. 5 but illustrating a modification in the shape of the male dies, and Fig. 8 shows the shape imparted by the die shown in Fig. 7.

In the practice of my invention, the female dies 2, $2^a$ are secured to an abutment 1 formed on or attached to the bed plate 3. As shown in Figs. 2 and 3 these dies are grooved, portions $a$ of such grooves being straight and of a diameter approximately equal to that of the rod under operation so as to support the parts of the bar or rod on each side and a short distance away from the line cut as hereinafter described. When it is desired to so shape the edges of the scarfed portions of the ends to be joined as shown in Fig. 6 as to partially infold or fit around the rod sections in the rear of the scarfed ends, the portions $b$ of the grooves in the faces of the dies are flared such flared portions extending to the line of cut.

The shear blade 4 is secured in the cross-head 5, which may be operated by any suitable means such for example as the fluid pressure cylinder 6, the cross-head being secured to the piston rod 7 of said cylinder. The male dies 8, $8^a$ should be so operated as to begin their action on the rod before the latter has been entirely severed, and hence it is preferred that these dies should be secured to the cross-head, one on each side of the blade 4, as shown in Figs. 1, 2 and 4. It will be observed that the dies and blade 4 are so constructed and so attached to the cross-head, that the bar or rod will be only partially severed before the dies begin their shaping operation.

It will observed that the operative faces of the dies are oppositely inclined and therefore when acting on the bars or rods they will act as a wedge tending to force the metal in opposite directions. If the bar or rod was entirely severed prior to the action of the dies, means would necessarily be employed to prevent the movement of the sections away from the dies. As the double scarfing causes a longitudinal flow of metal in opposite directions and consequent elongation proportional to such flow, it is impracticable to employ fixed stops or others which would prevent the flow and consequent elongation.

In the operation of the machine, which is especially adapted to carry out the method described and claimed in an application Serial No. 856,382, filed August 12th, 1914, the bodily longitudinal movement of the parts of the bar or rod on opposite sides of the blade is prevented by the unsheared portion of the bar or rod, during the initial shaping action of the dies. Until the blade has passed entirely through the rod or bar, this connecting web will be effective, but as this connecting web will be removed before the scarfing or shaping operation is completed, the operative faces of the dies 8, $8^a$ are provided with teeth or so roughened, so as to grip the surfaces of the bar or rod sections, and thereby prevent a bodily longitudinal movement of the sections during the final portion of the shaping operation. As the roughened faces of the dies have only a superficial grip on the sections, the flow of the internal metal, or portions not immediately engaged by the dies is not interfered with.

The feed of the bar or rod into the machine is regulated by a movable stop 9, which in the construction shown is so pivotally mounted on a pin 10, as to drop when free to move, into the path of movement of the bar or rod. In order that the stop may not interfere with the elongation of the bar during the scarfing operation, provision should be made for shifting it, before the shearing and shaping operations begin. This shifting may be effected by a finger 11 on the cross-head engaging and lifting the stop as the cross-head moves forward, and permits the stop to drop to operative position when the cross-head is moved back.

When forming the scarfs with curved lips c as shown in Fig. 3 the inner ends of the male dies 8, 8$^a$ are curved inwardly as shown in Fig. 5, but when making a plain flat scarf as shown in Fig. 8, the dies are straight as shown in Fig. 7.

In the manufacture of links the ends of the sections or blanks must be oppositely scarfed and hence the bar or rod should be turned one hundred and eighty degrees, on each forward feed.

I claim herein as my invention:

1. In a machine for scarfing the ends of bars, etc., the combination of spaced blocks provided with matrices, a reciprocating head, shaping dies and a shear blade secured to said head, the blade being arranged intermediate the dies and in fixed relation thereto.

2. In a machine for scarfing the ends of bars, etc., the combination of spaced blocks provided with matrices, a reciprocating head, shaping dies having oppositely inclined operative faces, a shear blade, said dies and blade being secured to the head, the blade being intermediate the dies and in such relation to the latter that the dies will begin to operate on the bar on both sides of the line of cut prior to the complete severance of the bar by the blade.

3. In a machine for scarfing the ends of bars, etc., the combination of spaced blocks provided with matrices, a reciprocating head, shaping dies having V-shaped operative faces and a shear blade carried by said head, and a movable stop or gage block for limiting the movement of the bar or rod into the machine and adapted to be shifted to inoperative position by the head when moving inwardly.

In testimony whereof, I have hereunto set my hand.

ROBERT A. CARTER.

Witnesses:
G. G. TRILL,
THOS. B. JOYCE.

Copies of this patent may be obtained for five cents each, by addressing the "Commissioner of Patents, Washington, D. C."